United States Patent

[11] 3,567,163

[72] Inventors Robert B. Kepp
 Orlando, Fla.;
 Raymond C. Shreckengost, Rockville, Md.
[21] Appl. No. 402,661
[22] Filed Oct. 8, 1964
[45] Patented Mar. 2, 1971
[73] Assignee Martin-Marietta Corporation
 Middle River, Md.

[54] GUIDANCE SYSTEM
 14 Claims, 23 Drawing Figs.
[52] U.S. Cl. .................................................. 244/3.14
[51] Int. Cl. .................................................. F41g 7/10
[50] Field of Search .......................................... 244/14 (D),
 14 (H); 250/203, 83.3 (IR); 244/3.14, 3.11, 3.16

[56] References Cited
 UNITED STATES PATENTS

| | | | |
|---|---|---|---|
| 2,930,894 | 3/1960 | Bozeman...................... | 244/14 |
| 2,944,763 | 7/1960 | Grandgent et al. ........... | 244/14 |
| 3,007,053 | 10/1961 | Merlen.......................... | 250/203 |
| 3,088,034 | 4/1963 | Jones, Jr. et al. ............. | 244/14 |
| 3,098,933 | 7/1963 | Barasch....................... | 244/14 |
| 3,169,726 | 2/1965 | Jackson....................... | 244/14 |
| 3,219,826 | 11/1965 | Letaw, Jr..................... | 244/14 |
| 3,239,674 | 3/1966 | Ardyan........................ | 244/14 |

*Primary Examiner*—Verlin R. Pendegrass
*Attorneys*—Michael A. Sileo, Jr., Julian C. Renfro and Gay Chin CLAIM 1. A missile guidance system comprising an optical system for receiving spectral energy from both a target and a missile, said optical system having an optical boresight axis, means in said optical system for separating target spectral energy from missile spectral energy, a target camera tube coupled to said optical system for developing an electrical signal representative of said target energy, a missile camera tube coupled to said optical system for developing an electrical signal representative of said missile energy, a TV monitor, means for feeding both said target energy signal and said missile energy signal to said TV monitor, a target tracking circuit for developing a difference signal representative of the difference in the line of sight position of said target from said boresight axis, means coupling said target energy signal to said target tracking circuit, a missile tracking circuit for developing a difference signal representative of the difference in the line of sight position of said missile from said boresight axis, means coupling said missile energy signal to said missile tracking circuit, means for comparing said difference signals to produce an error signal, and means for transmitting said error signal as a correction signal to said missile.

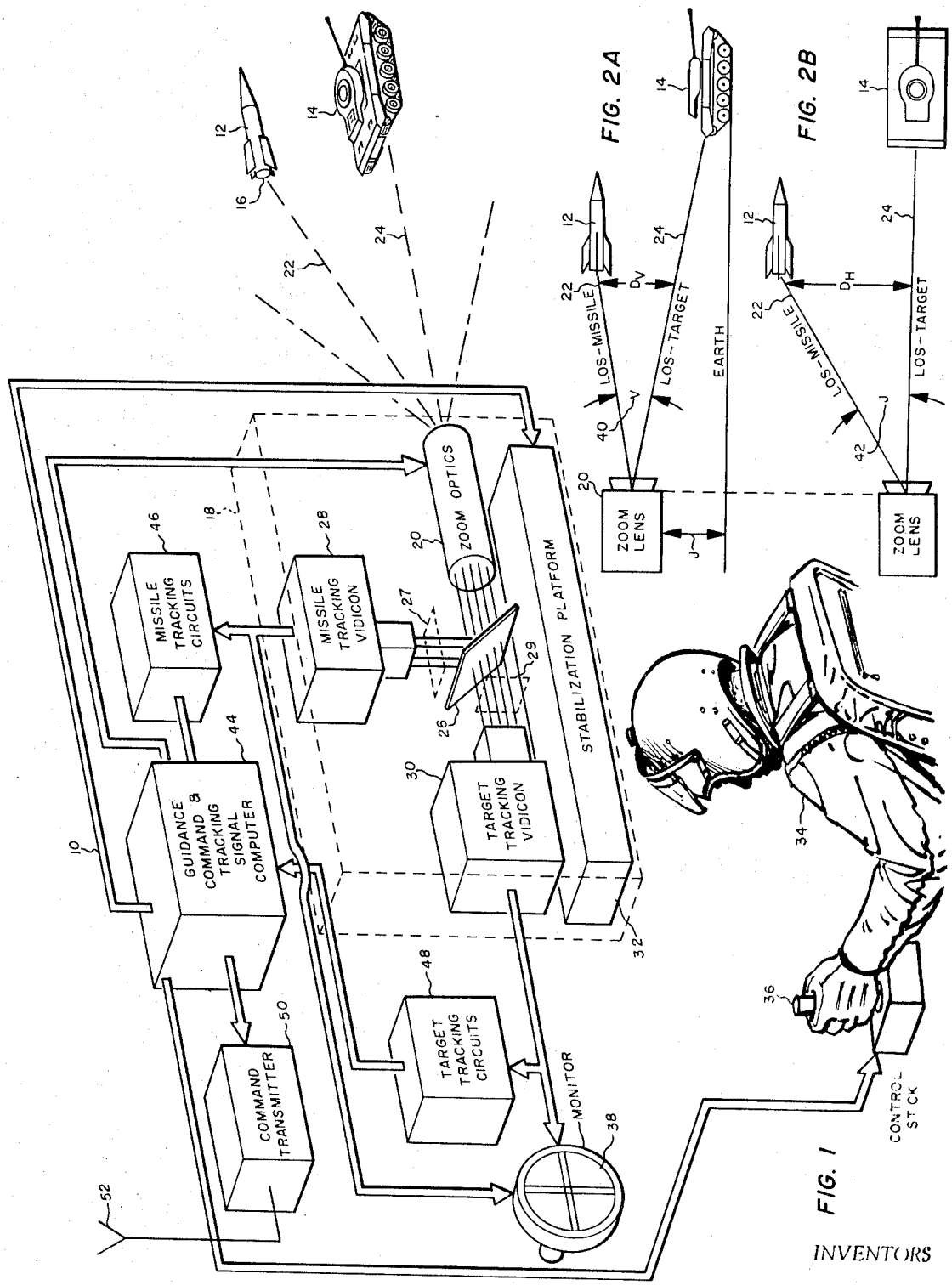

INVENTORS
RAYMOND C. SHRECKENGOST
BY ROBERT B. KEPP

INVENTORS
RAYMOND C. SHRECKENGOST
ROBERT B. KEPP

BY *M. A. Sileo, Jr.*

ATTORNEY

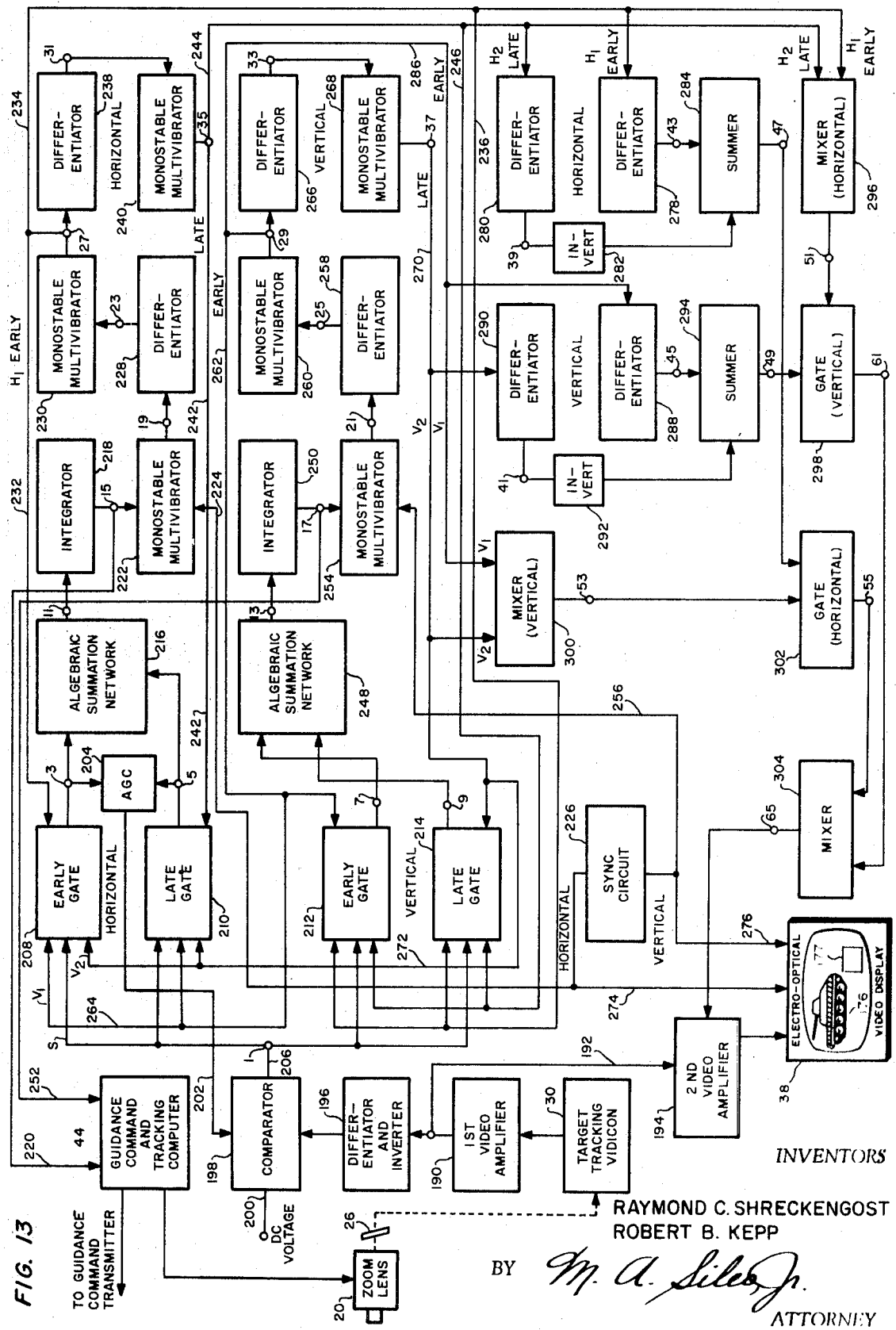

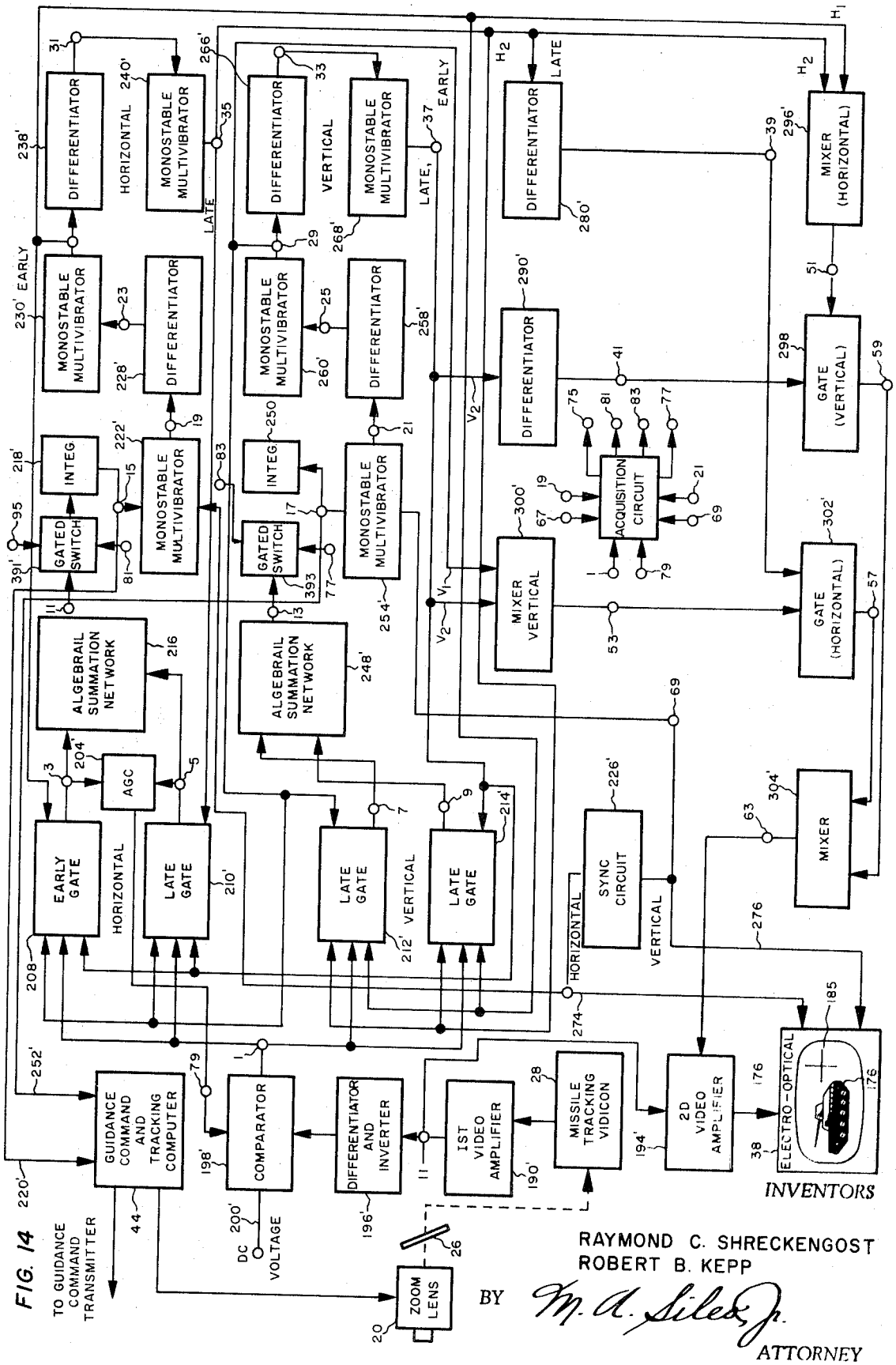

INVENTORS
RAYMOND C. SHRECKENGOST
ROBERT B. KEPP

BY M. A. Silee Jr.

ATTORNEY

INVENTORS
RAYMOND C. SHRECKENGOST
ROBERT B. KEPP

GUIDANCE SYSTEM

This invention relates to a novel missile guidance system and more particularly to a line of sight command guidance system particularly suited for use with air to ground rockets and missiles.

With the advent of the radio proximity fuse developed during World War II and the subsequent substantial increase in the amount of electronic equipment incorporated in a missile or other projectile coupled with the increased size and cost of the missile itself, the concept of missile expendability has gradually been completely revised. The days of firing heavy weapons "for effect" are largely gone and the current trend is to a weapons delivery system which optimizes the chance of a direct hit on the first try.

In the past, emphasis was only too often placed on the quantity of projectiles a given firepower could deliver. As a result, accuracy suffered. For example, artillery quite often used several rounds to bracket a target, correcting until a hit was made. However, with the advent of missiles, there came the necessity for a one shot barrage per target. The expense and complexity of the missiles led to a requirement for absolute accuracy. That is, the first shot must be right on the center of the target since if it is not, the element of surprise is lost and an expensive weapon is wasted. This means, then, not only must the guidance be accurate but all the prelaunch planning, calculations, and adjustments also must be made absolutely correct. No tolerance from calculated requirements is permissible. Accurate fire in volume is acceptable to the military, but the volume of fire as a substitute for accuracy is uniformly rejected.

Weapons delivery systems are continuously being improved and updated in an attempt to increase accuracy and to increase the chances that each and every missile or rocket launched strikes directly on its target. Some of the more recent systems utilize an optical sighting technique in conjunction with an automatic electronic tracking device which tracks the missile to the target. Systems of this type are particularly suited for short range weapons delivery such as in air to ground attacks where the missile tracking device is referenced to the pilot's line of sight to the target. These systems very often provide an optical display of both the target and missile positions and provide the pilot with a control stick or other control device so that he may successfully guide the missile to impact with its target. Refinements may include a variable optical system enabling the pilot to increase or decrease target magnification and at least one system provided a stabilized platform for the optical system providing the pilot with a limited degree of freedom in which to maneuver his aircraft and take evasive action.

However, insofar as applicants are aware, all of the prior systems require that the pilot maintain an accurate visual sight on the target so that he may guide the missile through its flight path to target impact. This necessitates that the pilot both establish and maintain through the entire flight of the missile some type of optical alignment with the target and continuously monitor the missile flight path so that he may accurately guide and positively control the flight of the missile. The result is that during a crucial and perhaps the most dangerous stage of the attack, the pilot's attention is largely taken up by preoccupation with missile delivery and the pilot's freedom to maneuver his aircraft and take evasive action is almost nil.

Since the flight time of the missile to the target very often coincides or substantially overlaps with the closest approach of the aircraft to the target it also represents the period during which the pilot and his aircraft are most susceptible to counter measures such as ground fire, antiaircraft, surface to air missile and to enemy aircraft. In addition to rendering the pilot and his airplane a relatively easy target for defensive counter measures, prior optical sighting systems suffer the serious disadvantages that their accuracy is directly dependent upon and largely determined by the accuracy with which the pilot by visual observation maintains the optical system directly centered on the target. The airplane may be subject to substantial buffeting by air currents so as to undergo movements about the pitch and yaw axes during flight and the pilot is incapable of devoting his full attention to missile delivery since he is at all times faced with the necessity of properly flying and maneuvering the aircraft. This pilot inaccuracy has long been recognized and is sometimes referred to as the pilot's tracking error. It is particularly aggravated when the target is not stationary but is a maneuverable ground vehicle such as a tank, truck or the like which itself may be taking evasive action.

The present invention to a large extent overcomes the above-mentioned difficulties by providing a completely electronic system which eliminates the necessity for the pilot to visually track the target for some time prior to and during missile flight. Once the target has been designated by the pilot and the initial prelaunch conditions of the system established, the pilot need only press a button to launch the missile. Both target and missile are automatically tracked by the system and the difference between the tracking signals derived from the target and missile is utilized as command guidance for the missile to guide it directly to the target. The pilot is free to devote full attention to the aircraft and the system is sufficiently flexible so that the pilot may take a substantial amount of evasive action both prior to the launch and during flight of the missile.

The system of the present invention electronically tracks both the target and the missile and provides a display of target and missile positions on a monitor screen visible to the pilot. The same electrical signals which are used to present the TV-type display are also the source of guidance information for the missile. The high information content signals of the TV viewing tube are the source of the tracking signals. The system has the advantage that the target tracking can be initiated without aiming the airplane or aiming the system directly at the target. The target tracking gates can be moved in the display by the operator and locked on to the selected target independent of the target in the display. Circuitry is provided in the system to permit the missile to be launched and automatically acquired even though not pointed directly at the target or at the line of sight of the target.

The functions of the pilot are essential to the system operation only during the prelaunch phase. After this, the pilot is completely out of the control loop but may retain control if he desires so as to apply a correction to the system or to take over complete manual control if he so desires. Absent this, his tasks include only interpretation of the displayed target data on the TV monitor, identification of the desired target, positioning the target tracker axis on the select target, and initiation of the automatic target tracking and missile launch functions. The post launch task of the pilot is completely supervisory in nature. He exercises no missile control functions unless he elects to reposition the target tracker axis to redefine the target lockon point.

In the device, electro-optical tracker hardware is combined with a guidance computer and command transmitter equipment in the proper manner to accomplish accurate automatic missile command guidance to a target selected by the pilot. The technique involved is suitable for night time as well as day time usage depending upon the particular tracker sensors utilized, and is applicable to various command guided type missiles. It provides enhanced missile delivery effectiveness by the use of automatic tracking and guidance techniques. Improved guidance accuracy, increased launch vehicle to target separation range, reduced operator participation, and night time operational capability are a few of the results obtained.

The target tracker portion of the unit receives the image of the target area as selected by the pilot through the optics of the system. The optical elements include a zoom-type lens and a dichroic beam splitter. In an alternative arrangement a double camera tube and filter assembly is substituted for the dichroic beam splitter. The zoom lens, controllable by the pilot, is used in the prelaunch target selection phase. Upon recognizing the general target area on the TV monitor the pilot zooms to a narrow field of view to provide sufficient image magnification to permit target recognition. The dichroic beam splitter provides spectral separation of the incoming optical energy. It allows selected wave lengths corresponding to the energy from the target to pass through to the target tracker and reflects certain other energy wavelengths to the missile tracker. By proper selection of the dichroic beam splitter (or filters, as the case may be) and missile flare spectral characteristics, the flare and target images can be separated for the purposes of independent tracking.

The target tracker provides target image information suitable for display to and interpretation by the pilot, including identification of the active tracking area within the tracker field of view. It also provides automatic tracking of a manually selected target and generation of output error signals in pitch and yaw corresponding to the current target position relative to an initial tracker boresight reference position.

The electro-optical missile tracker provides automatic acquisition of a missile flare image within its effective tracking zone shortly after launch and then automatic tracking of the missile flare image. This portion of the unit also generates output error signals in pitch and yaw corresponding to the current missile position relative to the same initial tracker boresight reference position. It generates a real or synthetic missile flare image signal which accurately locates the missile line of sight relative to the target line of sight on the TV monitor.

A control stick provides the operator with the prelaunch capability of controlling the time of initiation and degree of optical zoom required for image magnification purposes, the angular position of the system boresight axis for alignment on the target, and the initiation of the target tracking or lockon sequence. The system boresight axis position is automatically adjusted by applying torquing signals to the stabilized platform which supports the entire electro-optical tracker assembly. These signals are generated in a command computer in response to operator inputs to the control stick. In the postlaunch phase, the pilot may utilize the control stick to override the automatic tracking functions by way of the command computer and manually redesignate the target lockon position if required for improved guidance accuracy. The control stick also permits the operator to bypass the automatic tracking loop and assume direct manual control of the missile in the case of a malfunction in the automatic loop.

In addition to the above, the guidance computer detects the missile and target line of sight position signals from the respective trackers and by comparing these signals automatically generates the proper guidance commands to cause the missile to accurately fly along the target line of sight to impact. RF commands to the missile are sent by way of a command guidance transmitter.

It is therefore one object of the present invention to provide a novel missile guidance system.

Another object of the present invention is to provide a command guidance system for short range missiles and rockets.

Another object of the present invention is to provide a missile guidance system including automatic tracking units for tracking both the target and the missile.

Another object of the present invention is to provide a missile guidance system wherein both the missile and the target are tracked. Signals are derived representative of the position of both the target and the missile with respect to a reference line and these positional signals are then compared. The difference in the positional signals of the target and missile is representative of the missile deviation from the line of sight to the target and the difference signals are supplied as command intelligence to the missile correcting its flight path so that it coincides with the line of sight to the target.

Another object of the present invention is to provide a missile guidance system for use in conjunction with missiles provided with automatically ignited flares or other distinctive spectral characteristics The missile is automatically acquired by the system optics and both it and the target are optically tracked. A zoom optical system mounted on a stabilized platform receives the line of sight information from both the target and missile and differentiates between the two by means of a dichroic beam splitter which supplies spectral information on the missile position to a missile vidicon or camera tube and distinctive target spectral information to a second target vidicon or camera tube. Signals representative of the line of sight positions of both the target and the missile are derived from the vidicons and supplied to a TV-type monitor for presentation to the pilot. At the same time these signals are also supplied to a pair of trackers, one for tracking the target and the other for tracking the missile. The difference signals derived from the trackers are utilized as command signals for the missile directing it to the target. In addition, in the preferred embodiment the target tracking information is supplied to the stabilized platform upon which the optical unit is mounted so that the platform automatically follows the line of sight to the target.

Another object of the present invention is to provide a missile guidance system particularly suited for air to ground missile and rocket guidance. In the system, once the pilot has established prelaunch conditions, he is removed from all further responsibility of guiding the missile and is completely out of the control loop. However, provision is made wherein the pilot may take over manual control of the missile or if desired may precess the stabilized platform so as to move the optical system and redefine the target in the event this is desired. The target is initially acquired through a zoom lens in the search phase after which the pilot may zoom in on the target for positive identification. The target is then automatically followed by the optical system through suitable signals from the target tracker. Once the missile is launched, it is acquired by the optical system which then supplies suitable signals to the missile tracker for comparison with the signals from the target tracker. The difference between these two sets of signals is representative of the error in the line of sight positions between the target and missile and are used in a command guidance arrangement, to correct the missile flight to bring it on target.

These and further objects and advantages of the invention will be more apparent upon reference to the following specification, claims, and appended drawings wherein:

FIG. 1 is a diagrammatic view of the overall missile guidance system of the present invention.

FIG. 2A is an elevational view illustrating the vertical error between a missile line of sight and a target line of sight.

FIG. 2B is a plan view similar to FIG. 2A showing the horizontal error in missile line of sight with respect to target line of sight.

FIG. 13 is a detailed block diagram of the target tracker and associated equipment.

FIG. 14 is a similar detail block diagram of the missile tracker and associated equipment.

Figure 3:
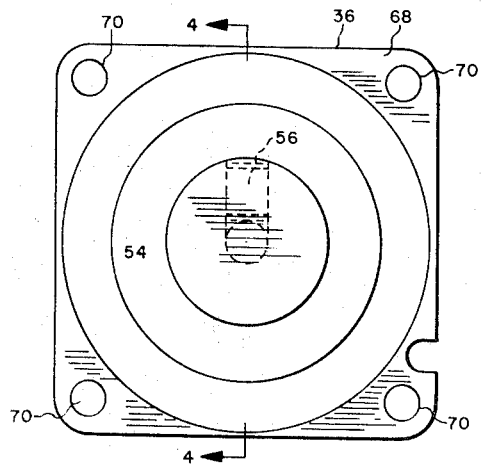
FIG. 3 is an elevation showing a control stick assembly usable in conjunction with the system of FIG. 1.

Referring to the drawings, the guidance system generally indicated at 10 in FIG. 1 is used to guide the missile 12 to a target 14, in this instance illustrated as a ground target in the form of an enemy tank. As used herein the term "missile" is meant to include all types of missiles, rockets, projectiles, space vehicles and the like capable of being guided. Missile 12 contains the usual receiver and radio guidance controls and is provided at its rear end with a flare 16 that is illuminated automatically when the missile is launched in a well-known manner. The predominantly red light from the missile flare 16 passes to an optical system generally indicated by dashed lines at 18 including a zoom optics or lens system 20 which receives not only the red flare image from the missile 12 over a line of sight path 22 to the missile but also receives target spectral information from the target 14 over a line of sight path 24.

The light passing through the optical system 20 impinges upon a dichroic beam splitter 26 of conventional construction in which the incoming rays are split, the predominantly red rays from the missile flare 16 passing to a first camera tube or missile vidicon 28 while the nonred or target spectral information passes to a second camera tube or target tracking vidicon 30. The optical system 18 is suitably mounted on gyroscopic gimbals as represented by the stabilization platform 32 in FIG. 1.

On an alternative arrangement, element 26 may take the form of a half-silvered mirror in which case suitable filters such as red filter 27 and blue filter 29 are provided to isolate the desired spectral characteristics. Furthermore, since small variations in boresight axis alignment present no serious problems, element 26 can be eliminated and two camera tubes with appropriate filters can be mounted side-by-side on platform 32. In this case, two side-by-side zoom lenses are provided one for each camera tube, spaced on axis about 4 inches apart and also mounted on the platform in axial alignment with the two camera tubes.

Operation of the system is under the control of a pilot 34 operating a control stick 36 in the cockpit of the mother aircraft. The pilot watches a TV monitor 38 which gives him a visual presentation of the target and missile and indicates any deviation in the line of sight path 22 to the missile from the line of sight path 24 to the target. This deviation may have both a vertical component as illustrated in FIG. 2A at 40 and a horizontal component as illustrated in FIG. 2B at 42. The control stick 36 is coupled by suitable circuitry to a guidance command and tracking signal computer generally indicated in FIG. 1 at 44.

The electrical output from the missile tracking vidicon 28 is supplied to the missile tracking circuits 46 and to the TV monitor 38. Similarly, the electrical output from target tracking vidicon 30 is supplied to the target tracking circuit 48 and to the TV monitor 38. Each of the tracking circuits 46 and 48 produces an electrical output referenced to the optical boresight axis of the zoom optic system 20 and these signals are supplied to the guidance command and tracking signal computer 44. A comparison of the tracking circuit outputs is made in the computer 44 and an error signal is derived and supplied by way of a command transmitter 50 to the antenna 52 on the mother aircraft. This antenna sends command signals in a well-known manner to the missile which act to direct the flight of the missile in accordance with any difference or error between the line of sight positions of the target and missile as supplied to computer 44. Computer 44 also as supplies control signals to the stabilization platform 32 in accordance with signals received from the target tracking circuits 48 so that the stabilization platform 32 and hence the optical axis of zoom optical system 20 automatically follows the target 14. The stabilization platform 32 is also controlled from the pilot stick 36 by way of the computer 44 during the search phase of the mission so that the pilot can initially align the optical system on the target prior to launch.

FIGS. 3, 4, 5 and 6 shown in detail the construction of the control stick and the manner in which signals are generated to precess the stabilization platform during the search phase of the operation when the pilot is seeking the target on the monitor 38. The control stick assembly 36 comprises a control knob 54 mounted by a suitable setscrew 56 on the end of a control shaft 58. The opposite end of the control stick is received within a housing 60 carrying at its opposite end an electrical connector 62. Received within the open end of the housing adjacent to the control stick is a collar 64 secured to the housing by screws such as indicated at 66 and provided with an integral mounting flange 68 having a plurality of mounting apertures 70. Secured to collar 68 is one end of a resilient boot 72 secured at its other end to the control shaft 58 and passing around spider 74.

A circular mounting block 76 is received within the control housing 60 and is secured to the housing by a plurality of screws, one of which is illustrated at 78. The mounting block supports a pair of control units 80 and 82 by means of screws 84 at each end of a respective control unit. Control unit 80 is in the form of an up and down potentiometer while control unit 82 is in the form of a right and left potentiometer. Secured to the center of the mounting block by a large nut 86 is a stud 88 carrying a stud ball 90. The stud ball is received in a socket 92 free to pivot about the head of the stud ball. The socket 92 is suitably secured to the hollow inner end of control shaft 58 which is provided with a bushing 94 enclosing a coil spring 96. Compression spring 96 urges a bearing ball 98 into engagement with the stud ball 90.

Figure 4:
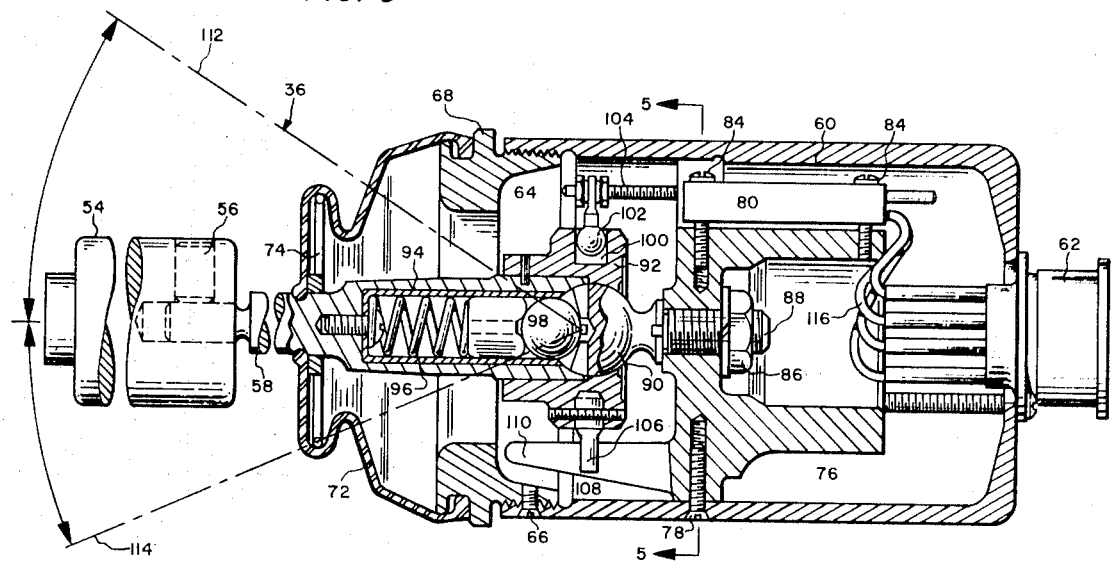
FIG. 4 is a cross section taken along line 4–4 of FIG. 3.

The outer periphery of socket 92 is provided with a pair of cavities, one of which is illustrated at 100 in FIG. 4 which cavities rotatably receive the heads of link balls 102 in turn mounted on potentiometer actuator rods 104. Socket 92 is also provided with a stop pin 106 slidably received in a slot 108 formed in the projecting portion 110 of the mounting block 76 so as to prevent transverse rotation of the socket 92 about the stud ball 90. As will be apparent, movement of the knob 54 in a first plane between the limits indicated by the dashed lines 112 and 114 in FIG. 4 causes the socket 92 to rotate about the stud ball 90 and to correspondingly move actuator rod 94 in or out with respect to control element or potentiometer 80 so as to vary the value of the potentiometer. Similarly, movement of the control knob 54 in a plane perpendicular to the plane of the paper causes a corresponding variation in the value of right-left potentiometer 82. The potentiometers are coupled to the connector 62 by way of a plurality of leads as illustrated at 116.

Figure 5:
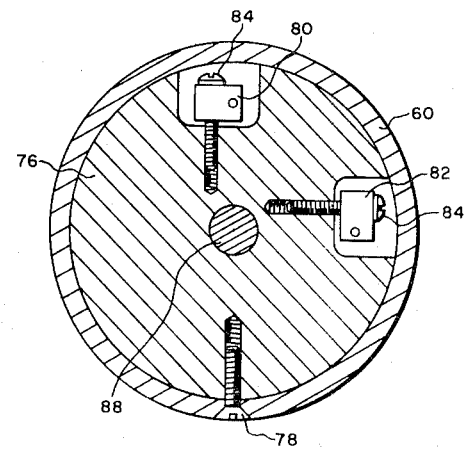
FIG. 5 is a cross section at right angles to that of FIG. 4.
Figure 6:
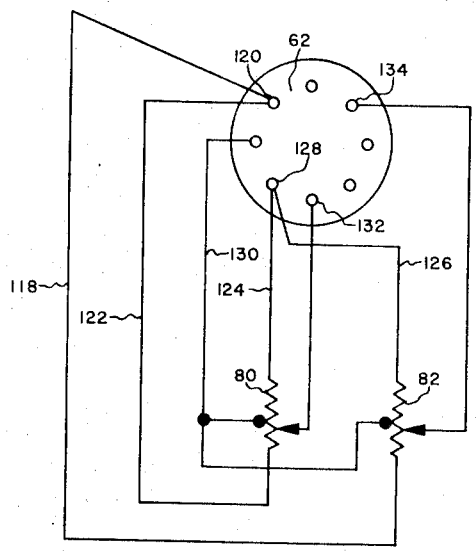
FIG. 6 is a wiring diagram for the control stick of FIGS. 3–5.

FIG. 6 shows the wiring diagram for the control assembly of FIG. 3, 4 and 5 and illustrates the connection to the potentiometers 80 and 82 from connector 62. Lead 118 couples the lower end of right-left potentiometer 82 to a ground terminal 120 whereas lead 122 similarly connects the lower end of up-down potentiometer 80 to the same terminal. The upper ends of potentiometers 80 and 82 are connected by way of leads 124 and 126 to a plus 20 volt DC source by way of terminal 128. An intermediate point on each of the potentiometers is returned to a reference potential (+9.4 plus or minus DC), volt DC), by way of lead 130. Movable taps on the potentiometers are connected to the output terminals 132 and 134. The two potentiometers in effect form a variable wheatstone bridge such that an up-down control voltage appears at output terminal 132 and a left-right control voltage appears at output terminal 134 in accordance with the position of control stick 58.

Figure 7:
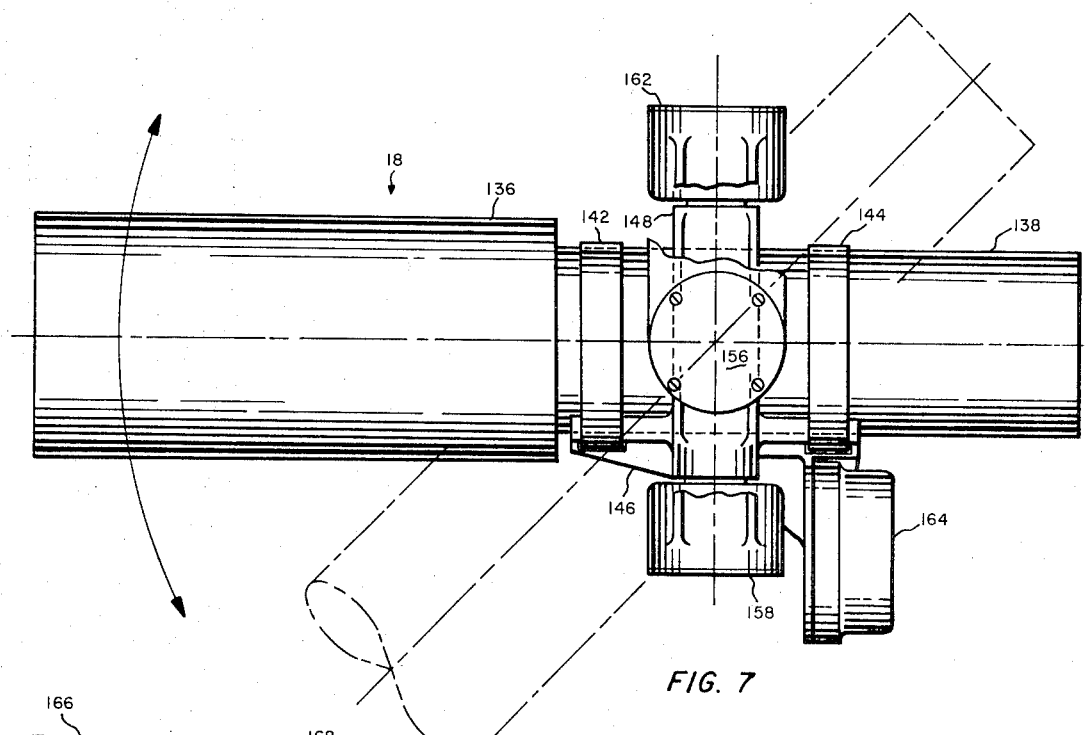
FIG. 7 is an elevational view of a stabilized optical system usable in the guidance system of FIG. 1.
Figure 8:
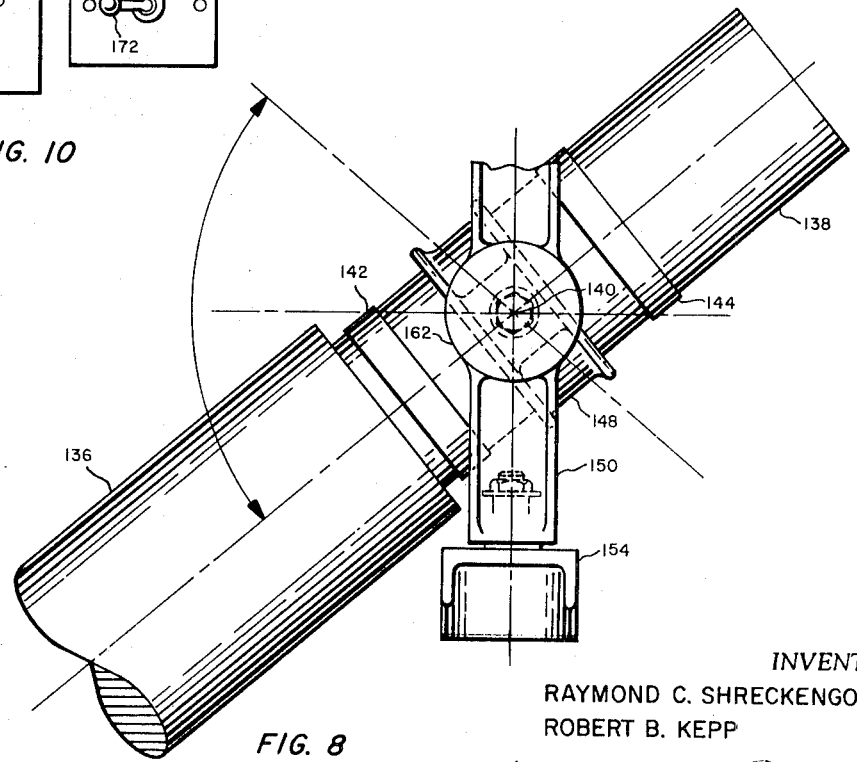
FIG. 8 is a plan view of the optical system of FIG. 7.
Figure 9:
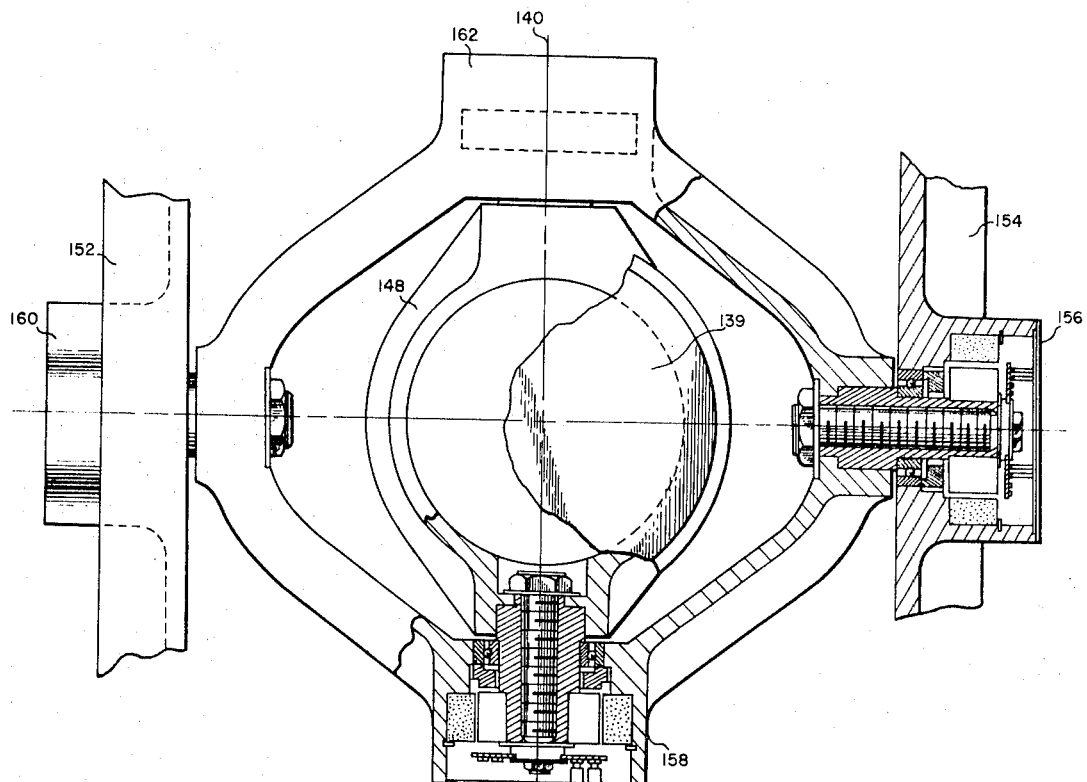
FIG. 9 is an elevation with parts in section illustrating the stabilization system of FIG. 7 and 8.

As previously mentioned, the control voltages derived from the control stick of FIGS. 3 through 6 are used to precess the stabilized optical system 18 of FIG. 1 as illustrated in more detail in FIGS. 7, 8 and 9. The optical system generally indicated at 18 in FIG. 7 comprises a casing 136 in which is mounted the zoom optics 20 and the two vidicons 28 and 30 of FIG. 1. Casing 136 is mounted on a gyro stabilized platform in the form of an enlarged weighted shaft 138 such that the center of gravity of the entire optical system passes through the gimbal axis illustrated at 140 in FIG. 8. Passing around the shaft 138 are a pair of metal straps 142 and 144 so that the shaft is secured to and supported by the base 146 of an inner gimbal 148. Inner gimbal 148 is rotatably mounted in an outer gimbal 150 in turn rotatably supported by a pair of stationary vertical supports 152 and 154. The gimbals are provided with a pair of conventional torque motors 156 and 158 illustrated in FIG. 9 and a pair of resolvers 160 and 162 for sensing angular movement of the gimbals. Resolver 160 is mounted on the elevation axis and resolver 162 is mounted on the deflection axis. Gimbals 148 and 150 are preferably in the form of magnesium castings.

The output control signals from the potentiometers of FIG. 6 are supplied to the torque motors 156 and 158 of FIG. 9 so as to precess the optical system 18 about the elevation axis as illustrated by the dashed lines in FIG. 7 and about the deflection axis as illustrated in FIG. 8. The center of gravity is preferably located at the intersection of the gimbal axes and the mounting system shown permits a deflection of approximately 130° about the deflection axis and movement of approximately 180° about the elevation axis. A conventional zoom lens mounted in casing 136 provides a zoom ratio of 10 to 1. In the preferred embodiment a rate gyro 164 is mounted on the base 146 of the inner gimbal as illustrated in FIG. 7.

Figure 10:
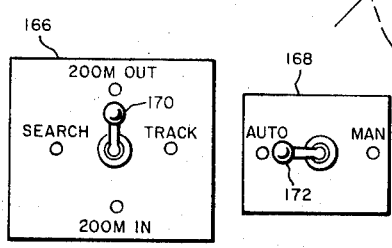
FIG. 10 illustrates additional switches used in the conjunction with the guidance system of FIG. 1.

Referring to FIG. 10, there is shown two additional units 166 and 168 adapted to be operated by the pilot. Control 166 comprises a four position switch electrically connected to the guidance command and tracking signal computer 44 of FIG. 1 and manually movable by the pilot into any one of four positions. The upper position is illustrated as zoom out, the lower position as zoom in, the leftmost position of the switch 170 as search and the right most position is labeled track. The second control unit 168 comprises a switch 172 having two alternative positions, namely, automatic and manual. These control units may be mounted on the dashboard of the cockpit convenient to the pilot or in the alternative one or both can be mounted on the control stick for ready operation by the pilot. For example, the switch 170 of control unit 166 may be incorporated in the knob 54 of FIG. 4.

In operation of the overall system, as the pilot approaches the target, in this case assumed to be a ground vehicle in the form of an enemy tank, switch 170 is set to the uppermost or zoom out position if not already there. Movement of the switch completes a circuit in the computer 44 which supplies a zoom out signal to the zoom lens system 20 of FIG 1. This system is preferably velocity operated in a well-known manner so as to decrease the magnification and accordingly increase the area si sensed by the optical system. The optical zoom lens is of conventional construction and is provided with two optional positions, namely, zoom out and zoom in, with the magnification in the zoom in position approximately 10 times that of the zoom out position. Velocity control is used to set the optical system 20 to "zoom out" when switch 170 is moved by the pilot to the leftmost or search position. Movement of the switch 170 to the search position completes a second circuit in the computer 44, placing the stabilized platform 32 under the control of the pilot's stick 36. That is, the output signals from the control stick are supplied through the computer to the torque motors 156 and 158 of FIG. 9 so as to precess the optical system to the desired position. At this time by suitably moving the control stick 36 the pilot is able to adjust the optical boresight axis of the optical system 30 until such time as the target is within view and preferably centered on the TV monitor 38 of FIG. 1. The switch 170 actuates control laching relays when it is momentarily moved to its search or track position. Thus, there is no neutral position when the switch is in search or track. The system is either in search or ta track, but never in both. However, the zoom control does have a neutral position which is independent of the search and track positions. The zoom procedure can be performed only when the switch is in the search position.

Once the target has been acquired on the monitor the pilot moves his switch 170 to the lowermost position or zoom in and the magnification of the optical system is increased so that the pilot may more clearly define the target. Once the enlarged target is presented on the monitor 38 the pilot may again move the switch to the search position and operate the control stick to more accurately center the target display on the monitor 38 and thus more accurately align the optical system on the target. When the pilot is satisfied that the optical system is directly centered on the target, having been properly precessed by the torque motors under the influence of control stick 36, switch 170 is moved to the rightmost position or the track position and the pilot is completely relieved of any necessity for further following the target. He may then initiate a launch of the missile in a conventional manner and both the target and missile are automatically tracked by the system and the missile automatically commanded or instructed to fly a line of sight course to the target as determined by the tracking signals supplied to the computer 44. An automatic acquisition circuit in the missile tracker as more fully described below automatically picks up the missile after it has been launched.

As previously mentioned, once the switch 170 is moved to the track position the pilot is relieved from any further necessity for following the target or missile and may return his attention to flying the aircraft and to taking whatever evasive action he may deem necessary. The stabilized platform is automatically precessed by signals from the computer derived from the target tracker so that the optical system locks on and remains centered on the target. However, a visual presentation of the target and missile is continuously presented on the TV monitor 38 and should the pilot decide to regain manual control he may do so in either of two ways.

For example, during his briefing the pilot may have been instructed that the desired target is at or near a prominent portion of landscape and may initially lock the system upon the identifying landscape feature. As an example, the pilot may have been instructed that a group of enemy tanks is positioned beneath a specific wooded area of land. He might then initially lock the system on the clump of trees beneath which the tanks may be camouflaged until such time as his approach brings him within a range that the actual target, that is, the tanks, a water tank, a building or the like itself may be identified. At this time the pilot returns the switch 170 to the search position and by suitable manipulation of the control stick 36 realigns the axis of the optical system on the specific rather than the general target. This may be referred to as the pilot redefining the target as a more specific element of a general target as he approaches closer to it. The switch is then returned to the track position and the subsequent procedures follow that described above.

Should the pilot decide from viewing the monitor 38 that due to a malfunction in the system the missile is not following a desired track towards the target he may take control of the system manually in a second manner referred to as a manual override. To do this the pilot moves the switch 172 of control element 168 from the leftmost or automatic position to the rightmost or manual position. This switch actuates a suitable circuit in the computer 44 so that the command signals to the missile are directly related to the position of the control stick 36. In this way the pilot may manually control the flight of the missile to the target.

Figure 11A:
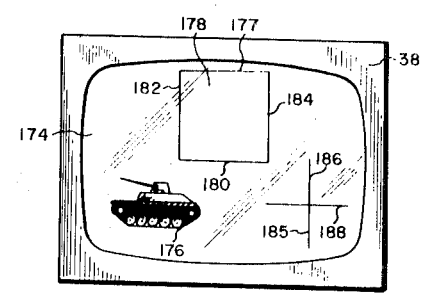
FIG. 11A is an enlarged view of the TV monitor of FIG. 1 illustrating the tracking window, the target image, and the missile image appearing on the monitor.
Figure 11B:
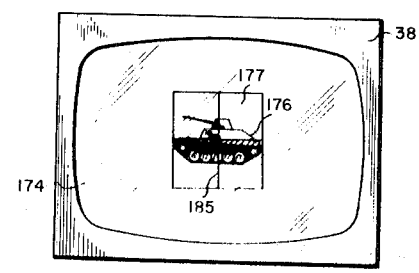
FIG. 11B is a view similar to that of FIG. 11A with the missile optically aligned with the target.

FIGS. 11A and 11B are enlarged views of the TV monitor 38 and illustrate the missile and target image presentations to the pilot appearing upon the TV screen 174. The three elements or images presented on the screen to the pilot are the target image 176, a tracking window or reticle preferably of square configuration defined by the spaced horizontal lines 178 and 180 and the spaced vertical lines 182 and 184 as well as the missile image or crosshair defined by the vertical line 186 and the crossing horizontal line 188. The length of the lines 186 and 188 are preferably equal to the dimensions of the square tracking window 177.

FIG. 11B illustrates the target image, crosshair, and tracking window all aligned and centered on the TV screen 174 as they would ideally appear to the pilot during proper flight of the missile directly to the target.

Referring to FIG. 13, there is shown a detailed block diagram of the target tracking circuits 48 of FIG. 1 and associated equipment including the zoom lens 20, beam splitter 26, target tracking vidicon 30, computer 44 and TV monitor 38. In this circuit, the target information is separated from the missile information passing through the zoom lens by the beam splitter 26 and the target information only passes to the target vidicon 30. Target tracking vidicon 30 is a conventional TV camera tube and presents a serial electrical output to a first video amplifier 190 representative of the incoming target information in the manner of a conventional TV camera tube. The output from the first video amplifier passes by way of lead 192 to a second video amplifier 194 and from there to the TV monitor 38 where this information is reproduced as the target image 176 on the screen of the monitor.

In order to accurately track the target the target information from first video amplifier 190 is also supplied to a differentiator and inverter which preferably includes a unipolar negative chopper for suitably shaping the input information. The output signals from the differentiator 196 are supplied to a level set comparator 198 also having a DC voltage input 200 and a third input on lead 202 from an automatic gain control circuit 204. The automatic gain control operates in a conventional manner to stabilize the input to the remaining portions of the circuit while the DC voltage to terminal 200 operates as a minimum level set such that the tracking unit ignores any input signals which do not exceed in magnitude a predetermined level as established by the DC voltage to the comparator from terminal 200. The output from comparator 198 is coupled by way of lead 206 to a horizontal channel including early and late gates 208 and 210 and also to a vertical channel including a pair of vertical early and late gates 212 and 214. Elements 208, 210, 212 and 214 act not only as gates but also as pulse stretchers.

From the horizontal early and late gates, signals are applied to the conventional automatic gain control circuit 204 and to a horizontal algebraic summation network 216, the output of which is representative of the difference between the signals from early gate 208 and late gate 210. The horizontal tracking signal is then supplied to an integrator 218 from which a horizontal difference signal may be derived and supplied by way of lead 220 to computer 44.

The output from integrator 218 is utilized to turn off a variable delay monostable multivibrator 222 which was previously turned on by the horizontal sync signal passing over lead 224 from the sync circuit 226. Monostable multivibrator 222 supplies a differentiator 228 which in turn triggers a fixed monostable multivibrator 230. The output from monostable multivibrator 230 is fed back by way of lead 232 to horizontal early gate 208 and is also fed by way of leads 234 and 236 to the vertical early gate 212 and to the vertical late gate 214. Monostable multivibrator 230 also feeds a differentiator 238 triggering a fixed monostable multivibrator 240. The output from monostable multivibrator 240 is fed back by way of lead 242 to horizontal late gate 210 and by way of leads 244 and 246 to the vertical early gate 212 and to the vertical late gate 214.

Similarly, for the vertical tracking channel, the outputs from early gate 212 and late gate 214 are supplied to a vertical algebraic summation network 248 which produces an output representative of the difference between the two input signals, this output being supplied to an integrator 250. An output signal is derived from the integrator 250 and is supplied by way of lead 252 as a vertical difference signal to computer 44.

Integrator 250 also turns off a variable delay monostable multivibrator 254 which has previously been turned on by a vertical sync signal on lead 256 from the sync circuit 226. The output from multivibrator 254 passes through a differentiator 258 to trigger a fixed delay monostable multivibrator 260. This signal is fed back by way of lead 262 to the vertical early gate 212 and is also fed by way of lead 264 to the horizontal early gate 208 and to the horizontal late gate 210.

Monostable multivibrator 260 also feeds a differentiator 266 triggering a fixed delay monostable multivibrator 268. The output from the latter is fed by way of lead 270 to the vertical late gate 214 and by way of lead 272 to the horizontal early gate 208 and the horizontal late gate 210.

In addition to tracking the target it is desirable that the tracking window 177 be visually displayed on the TV monitor 38. To accomplish this, horizontal and vertical sync signals are supplied from the sync circuit 226 by way of leads 274 and 276 to the horizontal and vertical sweep circuits of the TV monitor 38. At the same time the horizontal early output labeled H1 from monostable multivibrator 230 appearing on lead 234 is supplied as a horizontal early signal to a window display differentiator 278. A horizontal late signal indicated as H2 appearing upon lead 244 from multivibrator 240 is similarly applied to a second or late differentiator 280. The output from differentiator 280 is inverted in an inverter 282 and is supplied along with the output from differentiator 278 to a summer 284. Similarly, a vertical early signal indicated as V1 appearing on lead 262 is supplied by way of lead 206 to a vertical early differentiator 288. A vertical late signal indicated as V2 derived from multivibrator 268 is supplied to a vertical differentiator 290. The output from differentiator 290 is similarly inverted in inverter 292 and this inverted signal along with the signal from differentiator 288 is supplied to a summer 294.

The horizontal early and late signals H1 and H2 are also supplied to a horizontal mixer 296 feeding a vertical gate 298. Similarly, the vertical early and late signals V1 and V2 are fed to a vertical mixer 300 feeding a horizontal gate 302. The outputs from the vertical gate 298 and horizontal gate 302 are combined in mixer 304 and fed to the second video amplifier 194 and from there to the monitor 38 to produce the window image 177.

FIG. 14 similarly is a detailed block diagram showing the construction of the missile tracking circuits 46 of the FIG. 1 and again includes the common zoom lens 20, dichroic beam splitter 26 and computer 44 as well as the separate missile tracking vidicon 28. FIG. 14 will not be described in detail since the elements thereof and its mode of operation is for the most part quite similar to that previously described in conjunction with the target tracking circuits of FIG. 13. In FIG. 14 the elements corresponding to those in FIG. 13 are given the same number but with a prime to indicate that the element appearing in the missile circuit of FIG. 14 is similar to and forms a similar function with the correspondingly numbered element in the target circuit of FIG. 13.

One main difference in the circuit of FIG. 14 lies in the necessity for displaying the crosshair image 185 of the missile on the monitor 38 rather than the window 177 of FIG. 13. Since the missile crosshair is defined by only two rather than four lines on the monitor screen, elements corresponding to the summer's 294 and 284 of FIG. 13 are not required in the missile display portion of the circuit of FIG. 14.

Figure 12A:
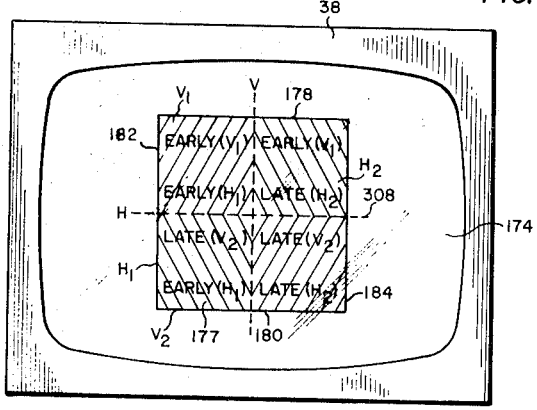
FIG. 12A is an even more enlarged view of the TV monitor illustrating the details of the target tracking window.
Figure 12B:
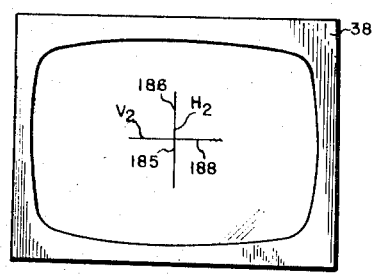
FIG. 12B is a view similar to FIG. 12A illustrating the details of the missile image presentation.

In order to understand the function and operation of the tracking circuits of FIGS. 13 and 14, references may be had to FIGS. 12A and 12B which are further enlarged views of the TV monitor 38. FIG. 12A illustrates the window image 177 of the monitor produced by the target tracking circuit of FIG. 13 while FIG. 12B illustrates the crosshair image 185 displayed on the monitor and produced by the missile tracking circuit of FIG. 14.

Referring specifically to the display of FIG. 12A in the target tracking circuit of FIG. 13, the screen 174 of the monitor may be thought of as divided into four quadrants by the vertical centerline 306 and the horizontal centerline 308. Furthermore, the early and late gates 208, 210, 212 and 214 may be thought of as defining in the tracking circuit the window 177 in a restricted central area of the screen through which tracking information may pass. That is, the early and late gates in FIG. 13 permit passage through them of any information coinciding in time with the area within the boundaries of the window defined by the horizontal lines 178 and 180 and the vertical lines 182 and 184. Any information which would otherwise occur outside the tracking window is blocked by the early and late gates and is not passed through the tracking channels of the circuit. It should be pointed out that this blocking action applies only to the tracking circuits since the entire scene is passed to the second video amplifier over lead 192 in FIG. 13 to be presented on the monitor.

The window 177 itself may be considered as divided into four equal quadrants positioned about the horizontal and vertical center lines 306 and 308 and indicated respectively as (A) early vertical V1 – early horizontal H1, (B) early vertical V1 – late horizontal H2, (C) late vertical V2 – early horizontal H1, and (D) late vertical V2 – late horizontal H2. Thus, tracking information will only pass through the gates if it appears in one of the four quadrants of the window.

In order to pass through the first quadrant of the window, the incoming intelligence signal must occur at the same time as both a V1 signal and an H1 signal and similarly for the other quadrants of the tracking window. Thus, considering early gate 208 and the horizontal tracking channel of FIG. 13, target signal information on lead 206 will only pass through the early gate 208 if it coincides in time with two other pulse signals, namely, the simultaneous application to early gate 208 of both an H1 signal and V1 signal or both an H1 signal and a V2 signal. If the incoming information on lead 206 coincides with an H1 and V1 signal it will pass through the upper left quadrant of the window illustrated in FIG. 12A. Similarly, horizontal late gate 210 in FIG. 13 requires that the incoming information on lead 206 in order to pass through that gate coincide with both a horizontal late or H2 signal and either an early vertical (V1) or late vertical (V2) pulse. The same is true for the vertical early gate 212 and the vertical late gate 214 in that each requires the simultaneous occurrence of two gating pulses to be turned on so as to pass the incoming information.

The function of algebraic summation network 216 in the horizontal channel of FIG. 13 is to produce an output representative of the difference between the intelligence signals passed by the early gate 208 and the late gate 210. Thus, the output from summation network 16 is representative of the difference between the intelligence signals passing through the two left-hand quadrants of the window in FIG. 12A and the intelligence information passing through the rightmost two quadrants in FIG. 12A. Similarly, the output from algebraic summation network 248 in the vertical channel is representative of the difference between the target information passing through the uppermost two quadrants in FIG. 12A from the information passing through the lowermost two quadrants. In other words, the horizontal channel makes a comparison between the target information appearing on opposite sides of the vertical centerline 306 whereas the vertical channel makes a comparison of the target information appearing upon opposite sides of the horizontal centerline 308. If in either case there is an unbalance a difference signal is generated at the corresponding terminal 11 and 13 and supplied to computer 44. These are used to precess the platform to recenter the optical axis on the target and are compared with the difference signals from the missile tracker of FIG. 14 to produce an error signal for the command transmitter to correct the missile flight.

The difference signals appearing at the outputs of the algebraic summation networks 216 and 248 occur periodically. That is, only when the monitor sweep is passing over the area of the window in FIG. 12A. Horizontal information appears during intermediate portions of several horizontal sweeps and then is completely lacking when the screen 174 is being scanned above and below the area of the window. Similarly, vertical information only appears periodically when the scan is within the area of the window and substantial portions of the vertical sweep are blanked, that is, during the conventional flyback and sync times of the monitor and also those times when the information signal is blocked by the early and late gates. Because of its periodic nature the target information is passed from the summation networks through the respective integrators 218 and 250 to obtain an average signal representative of the difference in information content in the respective halves of the target window. Thus, the magnitude of the signal appearing on line 220 is representative of the position of the target with respect to the horizontal centerline 308 and the output to the computer on line 252 is similarly of a magnitude corresponding to the relative position of the target with respect to the vertical centerline 306 in FIG. 12A. These signals are suitably modified in the computer 44 and transferred as correction signals to the stabilization system of the zoom lens. That is, one of the signals is supplied to the torque motor 156 of FIG. 9 and the other to the torque motor 158 so as to reposition the optical system in accordance with the deviation of the target from the intersection of the vertical and horizontal centerlines 306 and 308 of FIG. 12A. These signals are also compared in the computer with similar signals derived from the missile tracking circuit of FIG. 14.

Figure 15A:
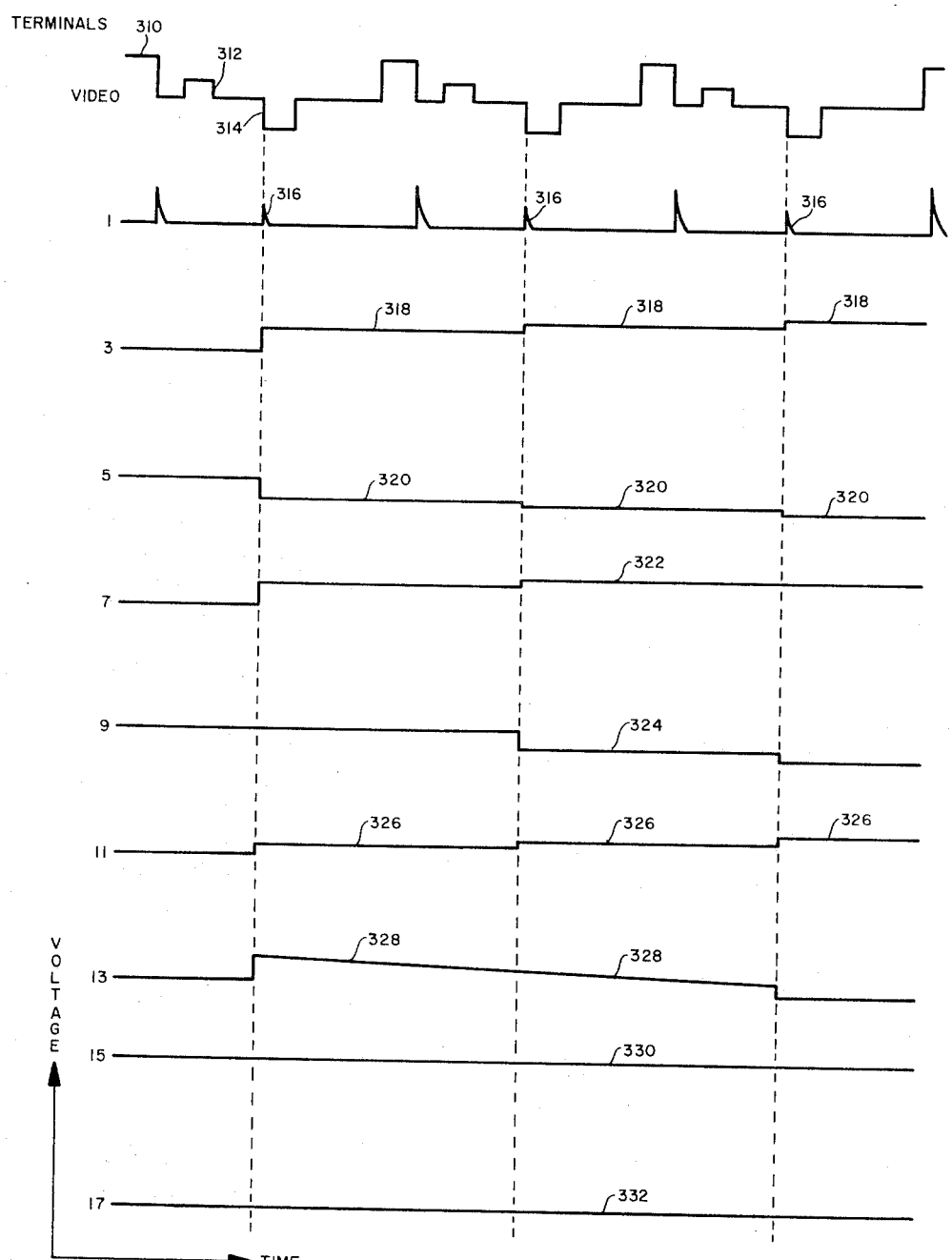
FIGS. 15A, 15B and 15C are wave forms and timing diagrams for the signals appearing at various points in the tracker circuits of FIGS. 13 and 14.

FIGS. 15A, B and C illustrate the waveforms appearing at various locations in the block diagrams of FIGS. 13 and 14 which are numbered accordingly. They are plotted as a function of voltage versus time with the time scale varying from waveform to waveform in accordance with whether or not it represents a horizontal or vertical signal since in conventional television interlace scanning as used herein one complete vertical sweep occurs for approximately every 200 horizontal lines or scans and thus the time scales are necessarily quite different.

In FIG. 15A the first curve represents the video output from the first video amplifier and may be generally representative of the type of signals received from both the target tracking vidicon and the missile tracking vidicon. In FIG. 15A the first large positive going pulse at 310 is representative of a typical horizontal blanking and sync pulse. The second smaller pulse 312 will hereinafter be referred to as a black pulse representative of undesired target information. Finally, the pulse train in FIG. 15A illustrates a fairly large negative or a white pulse 314 representative of the desired target to be tracked. While the input train is shown as pulses it will be understood that the video input normally is of irregular shape but with relatively large impulses appearing at points of target contrast. Furthermore, the discussion assumes the desirability of tracing a white target but other types of target information may be identified by the system as that desired, for example, the system can be modified to track a black target if desired. Similarly, through the use of suitable filters, other color characteristics of the target may be chosen with equal facility.

The video input in the first line of FIG. 15A is illustrated over approximately three horizontal lines or scans. The description of these FIGS. will proceed in conjunction with the target tracker of FIG. 13 but the waveforms shown are equally representative of those appearing in the missile tracker of FIG. 14 as illustrated by the fact that the waveforms are referred to by the same numbers in both FIG. 13 and FIG. 14. Where the waveforms differ for the two FIGS. they have been numbered accordingly.

The video waveform passes through the differentiator 196 of FIG. 13 and the comparator, the former acting also as a unipole negative chopper to produce a positive going pulse or pip as illustrated in the waveform at 1 coincident with the leading negative going edge of the white signal or pulse 314. These differentiated pulses or pips representative of the desired target information are indicated at 316 of waveform 1. One pip is obtained each time a horizontal scan passes over the target.

Waveforms 3, 5, 7 and 9 are purely diagrammatic in nature and are illustrative of the magnitude of the target intelligence passed through each of the gates during a sweep. For example, curve 3 illustrates a positive value during the first horizontal sweep and increasing values during subsequent sweeps as indicated at 318. This is due to the storage characteristic of early gate and pulse stretcher 208. The target information passed through the horizontal late gate 210, is of opposite polarity and slightly different magnitude during each sweep as illustrated at 320 in waveform 5. The target information passed through the vertical early and late gates is illustrated at 322 and 324, respectively, in waveforms 7 and 9, in this case representative of the vertical sweep periods and hence drawn to a much different time scale. The ratio of the horizontal to vertical time scales in these FIGS. is approximately 230/1. The outputs of the horizontal early and late gate signals 318 and 320 are algebraically summed in network 216 to produce a positive signal content as illustrated by the waveform 326. That is, the waveform 326 represents the difference between waveforms 318 and 320. Similarly, summing network 248 for the vertical channel has a signal content indicated at 328 representative of the difference between curves 322 and 324.

The signals are integrated in integrators 218 and 250, respectively, to produce the integrated horizontal output 330 which is a slowly varying DC analogue and a similar integrated vertical output 332. The analogue signals 330 and 332 are supplied as difference signals by way of leads 220 and 252 to the computer 44 for actuation of the zoom lens stabilized platform and for a comparison with similar signals from the missile tracking circuit.

As previously stated, monostable multivibrator 222 is of the variable delay type with the delay being controlled by the voltage output from integrator 218. Multivibrator 222 is turned on by a horizontal sync pulse from the sync circuit 226 in FIG. 13 but the time it remains on, that is its delay, is determined by the magnitude of the voltage at terminal 15. The output for multivibrator 222 is illustrated by the waveform 19 in FIG. 15B. Thus, the width of the pulses 334 and more specifically, the position in time of their trailing edges is directly dependent upon the difference voltage developed at the output of integrator 218. Integrator 250 is similarly of the voltage controllable variable delay type so that the trailing edges of its output pulses illustrated at 336 in FIG. 15B are similarly directly dependent upon the difference voltage developed at the output of integrator 250.

Figure 15B:
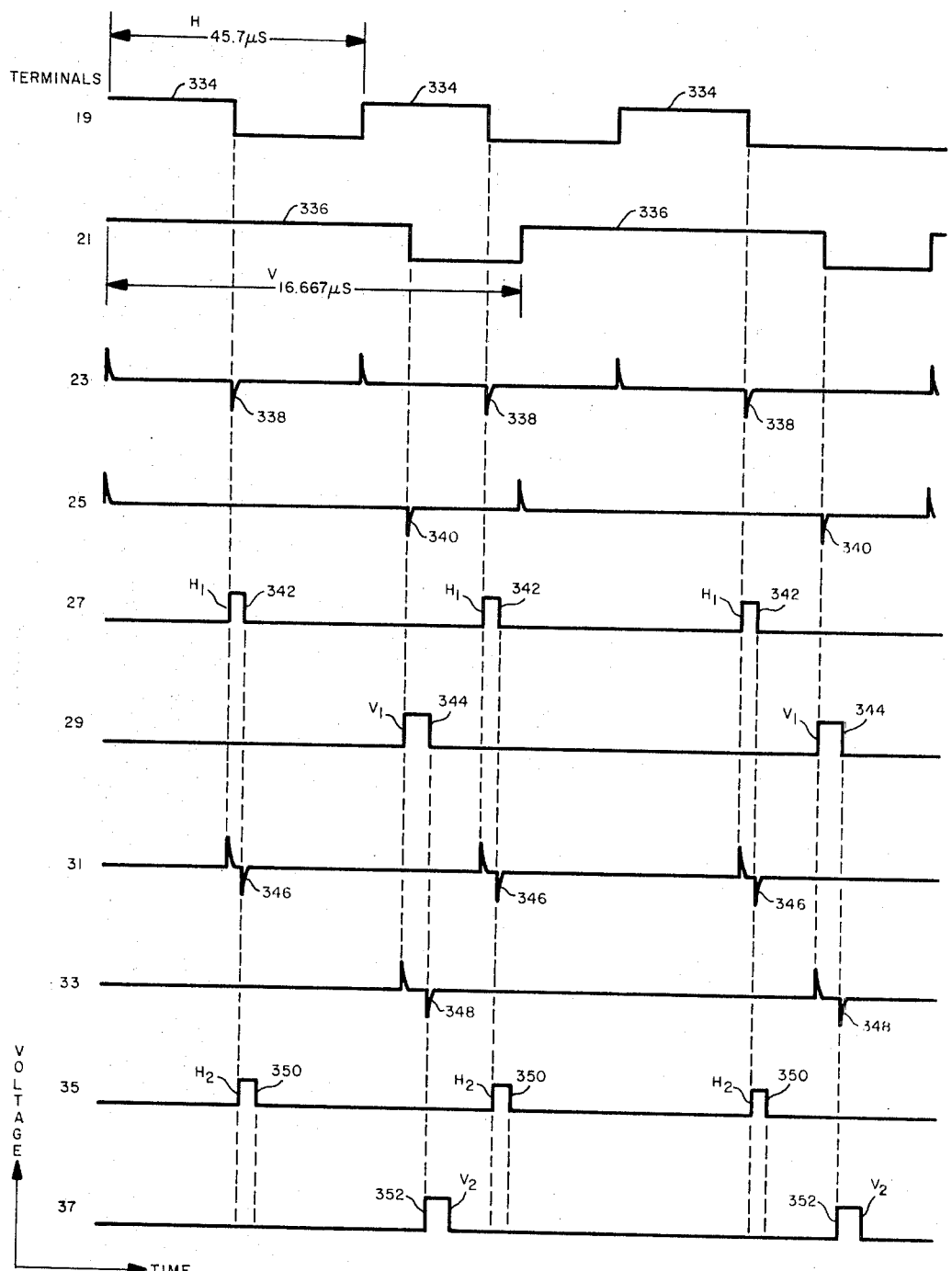

The output pulses 334 from the horizontal multivibrator 222 pass through differentiator 228 to produce the negative pips 338 while the vertical differentiator 258 similarly develops the negative pips 340 in FIG. 15B. Horizontal pips 338 trigger a monostable multivibrator 230 of the fixed delay type so that the width of its output pulses 342 are always constant. Similarly, vertical pips 340 trigger monostable multivibrator 260 also of a fixed delay having constant width output pulses 344. Pulses 342 are the horizontal early or H1 signals previously described while the pulses 344 constitute the vertical early or V1 signals previously described.

The early pulses 342 and 344 are fed through respective differentiators 238 and 266 to produce the negative pips 346 and 348 in the respective channels. Pulses 346 trigger a fixed delay monostable multivibrator 240 to produce horizontal late pulses 350 while pips 348 trigger a similar vertical fixed delay monostable multivibrator 268 to produce the vertical late pulses 352. Pulses 350 are the H2 pulse signals previously described and are fed back to the horizontal late gate 210 while pulses 352 are the V2 signals previously described fed back to the vertical late gate 214.

In order to generate a visual image 177 of the target tracker window and the crosshair image 185 of the missile tracker on the TV monitor 38, it is necessary that portions of the early and late signals in proper combination be applied to the monitor through the second video amplifier 194. For a better understanding of the remaining circuitry in FIGS. 13 and 14, reference may be had to FIGS. 16A and 16B which show the tracking window image 177 and the missile crosshair image 185 to a further enlarged scale. As is apparent from FIG. 16A, the top line 178 of the tracking window image is formed by the central portion of a single horizontal trace generated by the leading edge of the early vertical or V1 signal. Similarly, the lower line 180 is formed by the central portion of a horizontal trace generated by the trailing edge of the vertical late or V2 signal pulse. The leftmost line 182 of the window image is in fact a vertical series of very short portions of horizontal traces which are generated by the leading edge of the H1 or early horizontal pulses. Similarly, the rightmost line 184 is a series of short traces generated by the trailing edge of the late horizontal or H2 pulses.

Figures 16A, 16B:
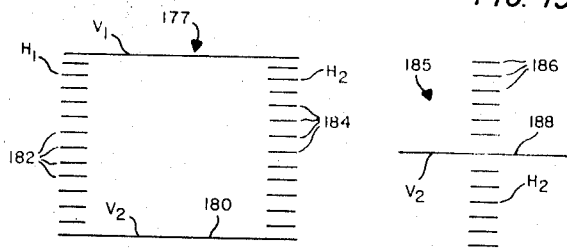
FIGS. 16A and 16B are enlarged views of the tracking window and missile crosshair images as display on the TV monitor of the system of FIG. 1.
Figure 15C:
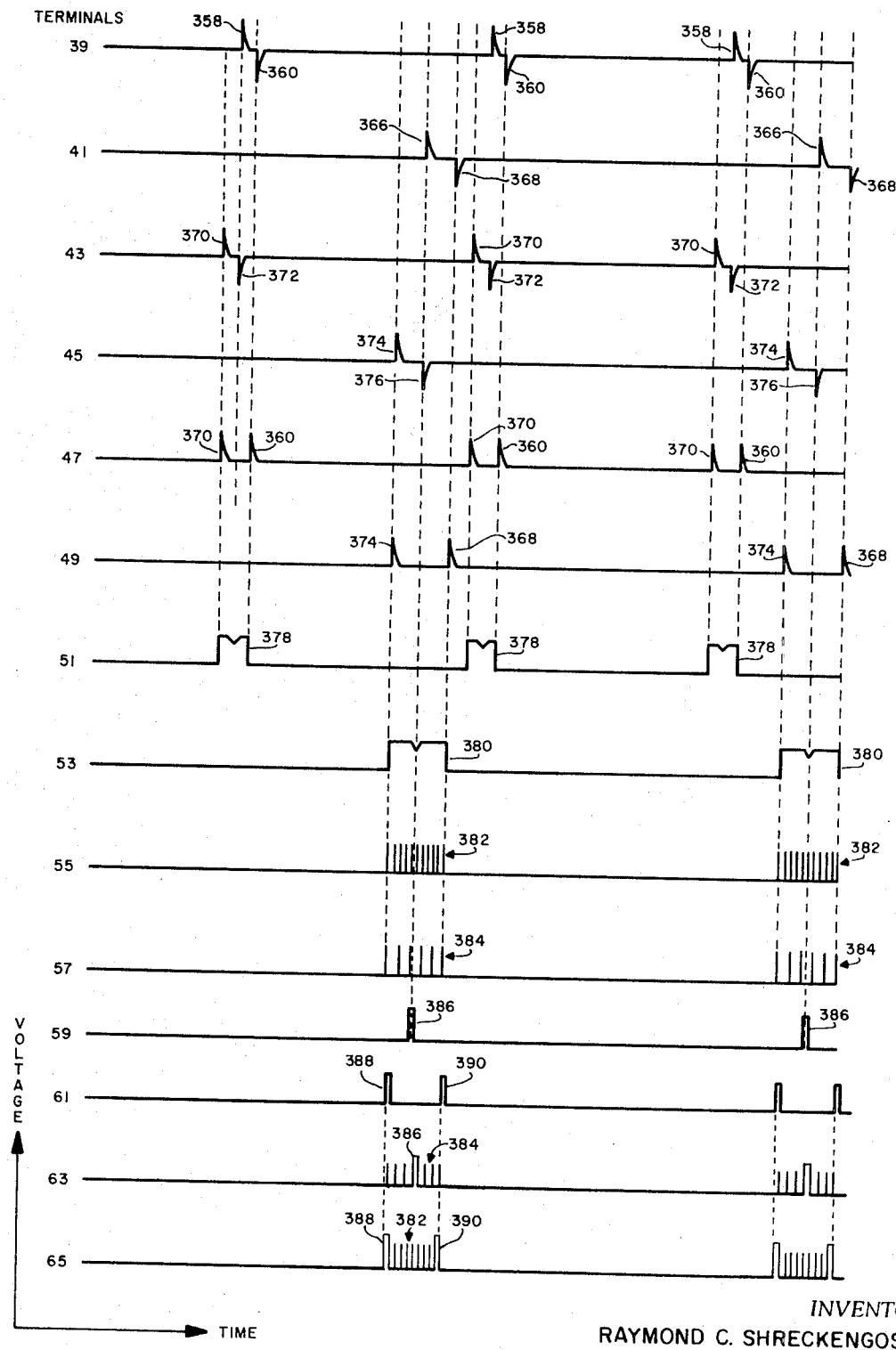

In FIG. 16B the horizontal center line 188 is a relatively long portion of a horizontal trace which is generated by the leading edge of the late vertical or V2 pulses. Vertical line 186 is in fact composed of a series of very short races generated by the leading edge of the late horizontal or H2 pulses. It is of course apparent in FIG. 16B that the crosshair could be formed if desired by traces derived from the trailing edges of the early pulses rather than from the leading edges of the late pulses as shown.

Referring to FIGS. 15B and C, the H2 pulses 350 passing through differentiator 280 in FIG. 13 produce the pips 358 and 360 at terminal 39 in FIG. 13. The corresponding V2 pulses pass through differentiators 390 to produce the pips 366 and 368 at terminal 41 in FIG. 13.

The early pulses pass through differentiators only in the circuit of FIG. 13 with the horizontal early pulses passing through differentiator 378 to produce the pips 370 and 372 at terminal 43 in FIG. 13 and the vertical pulses passing through differentiator 288 to produce the pips 374 and 376 at terminal 45 in FIG. 13. As is apparent, the reason for this additional circuitry in FIG. 13 is due to the necessity for generating the image 177 consisting of four lines as opposed to the requirement in the circuit of FIG. 14 of generating only the two lines of the crosshair image 185.

The pips 360 from differentiator 280 of FIG. 13 are inverted in inverter 282 and combined with the pips 370 from differentiator 278 in summer 284 to produce pips at terminal 47 in FIG. 13 which are spaced in time a distance equal to the distance between the leading edge of the H1 pulses 342 of waveform 27 and the trailing edge of the H2 pulses 350 of waveform 35. Similarly, the inverted pips 368 having passed through inverter 292 from terminal 41 of FIG. 13 are combined in summer 294 with the pips 374 from terminal 45 to produce the pips at terminal 49 whose spacing is equal in time to the distance between the leading edge of the V1 pulses 344 at terminal 29 and the trailing edge of the V2 pulses 352 at terminal 37. The horizontal early and late pulses are combined in horizontal mixer 296 to produce a combined pulse 378 at terminal 51 equal in width to the combined width of the H1 pulses 342 and the H2 pulses 350 which combined pulses are used to gate the vertical gate 298. In a similar manner the vertical pulses 344 and 352 are combined in a vertical mixer 300 to produce combined vertical pulses 380 equal in width to the sum of the V1 and V2 pulses at terminal 53 which combined pulses are applied as gating signals to the horizontal gate 302 of FIG. 13.

Considering gate 298 of FIG. 13, this gate is enabled for a series of short times, each equal to the width of the combined horizontal pulses 378. That is, this gate is enabled during the successive periods that the monitor trace sweeps across the distance from line 182 to line 184 of the window. However, it receives from summer 294 the two pips 368 and 374 at terminal 49 which pips in fact form the traces 178 and 180 as illustrated in FIG. 16A. Horizontal gate 302, on the other hand, is enabled by the much longer combined pulses 380 which define the time it takes the trace on the TV monitor to cover the distance in a series of horizontal traces between the lines 178 and 180. However, this gate receives as an input the pips 360 and 370 which occur in pairs during each horizontal sweep with the first of each pair defining the short traces 182 and the latter or pips 360 forming the second short traces 184 in FIG. 16A. The output from the horizontal gate 302 at terminal 55 is illustrated by the series of very short pips 382 which as described above occur in pairs to define the trace lines 182 and 184. The output from vertical gate 298 at terminal 61 forms the two larger pips 388 and 390 forming the traces 178 and 180 of FIG. 16A. These two sets of traces are combined in the mixer 304 to produce the combined pips illustrated by the waveform 65.

In FIG. 14 the early and late pulses are similarly combined in the horizontal mixed 296' and the vertical mixer 300' to produce the combined width pulses 378 and 380, respectively. However, in this FIG., only the late pulses are differentiated in differentiators 280' and 290' and supplied as inputs to the gates 298' and 302'. Thus, vertical gate 298' passes only the large pip 386 illustrated by waveform 59 which corresponds to the pip 366 at terminal 41 generated by the leading edge of the V2 pulse 352. Likewise, horizontal gate 302' passes only the series of pips 384 illustrated by waveform 57 corresponding to the pips 358 at terminal 53 which correspond in time to the leading edge of the H2 pulses 350. Large pip 386 at terminal 59, forms the horizontal trace 188 of FIG. 16B while the pips 384 form the short traces of FIG. 16B. These are combined in mixer 304' to produce the waveform 63 and applied to the second video amplifier 194' for display on the monitor.

FIG. 14 shows a missile acquisition circuit 389 which cooperates with gated switches 391 and 393 coupled to the outputs of the algebraic summation networks to automatically acquire the missile after it has been launched so that it may be followed by the missile tracker. FIG. 18 is a more detailed showing of this circuit while FIG. 19 illustrates the wave forms at various locations in the circuit of FIG. 18.

Briefly the video output from comparator 198' is supplied to a horizontal gate and detector 395 and a vertical gate and detector 397. This waveform is the same as that illustrated in the first line of FIG. 15A. Horizontal and vertical sync signals from sync generator 226 are also supplied to the acquisition gates through inhibitors 385 and 387. They also receive inputs from the monostable multivibrators and supply an output to the gated switches 391 and 393 which are actuated by a trigger 399. The gated switches receive the outputs from the algebraic summation networks and pass them on to the integrators 218' and 250' in the horizontal and vertical channels. The trigger is fired by a predetermined level of AGC signal appearing at terminal 79. In this way the gated switches are only opened to render the missile tracker operative when the incoming video signal is of sufficient strength, that is when the missile comes into view having a predominant spectral characteristic to which the missile vidicon or camera tube is responsive. With an increase in video input signal the AGC changes accordingly and fires trigger 399 to open the gated switches 391 and 393. Once the missile has been acquired the operation of the missile tracker is as described above.

Figure 17:
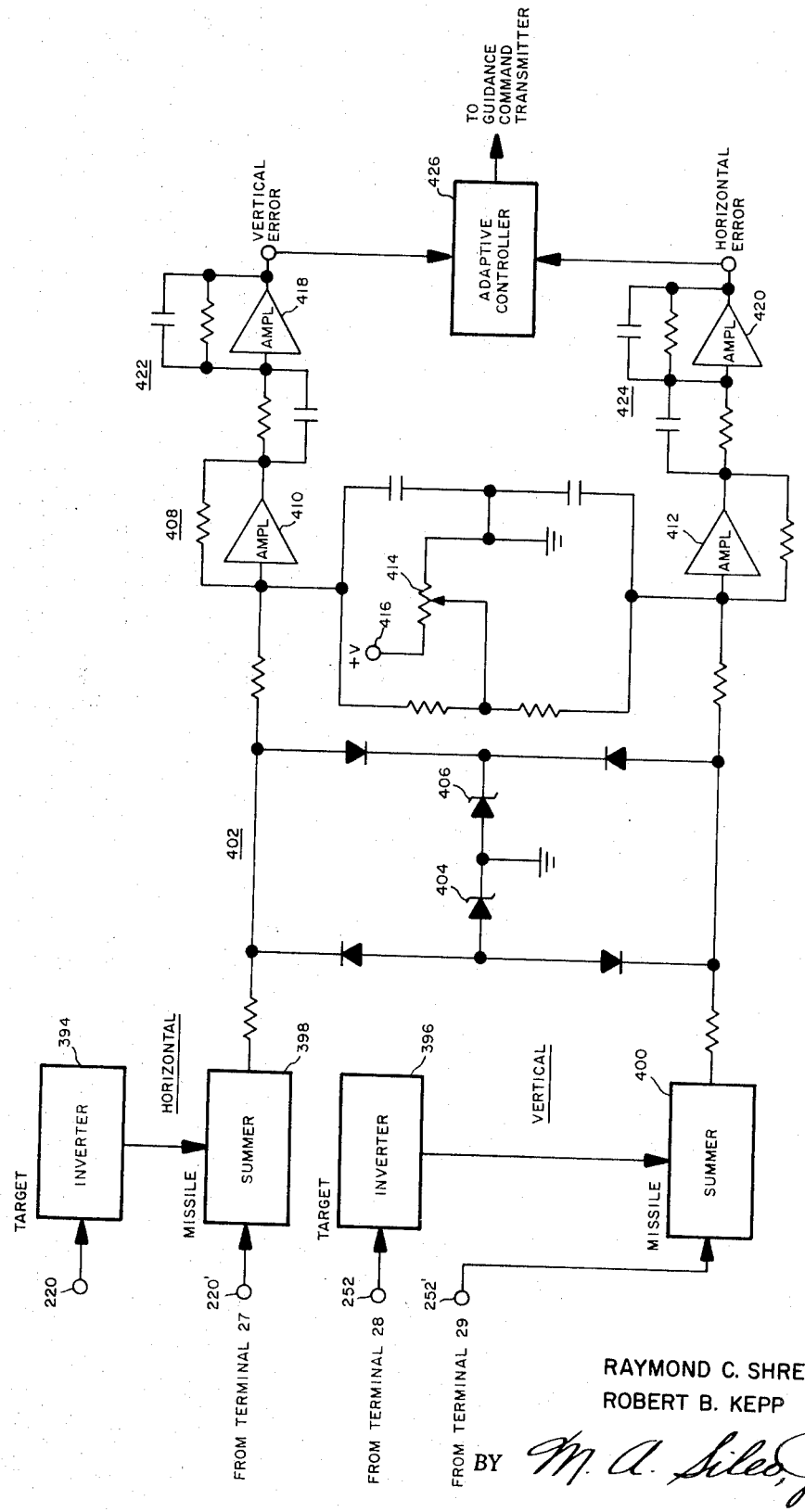
FIG. 17 is a circuit diagram of the guidance command and tracking computer of FIGS. 13 and 14.

FIG. 17 is a detailed circuit diagram of the missile control portion of the guidance command and tracking computer 44 of FIG. 1. The error signals on leads 220 and 252 are supplied through inverters 394 and 396 to the summers 398 and 400. The summers also receive the error signals from the missile circuit of FIG. 14, that is, from the leads 220' and 252' of that circuit. Since the error signals are all of the same polarity those from the target are passed through inverters such as inverters 394 and 396 so that they may be compared with, that is, subtracted from, the missile signals supplied to these summers. The output from the summer 398 is the difference between the horizontal target and missile deviations while the output from summer 400 is the difference between the vertical target and missile deviations. That is, in summer 398 the horizontal coordinate of the target line of sight position is compared with the horizontal coordinate of the missile line of sight position and the difference developed at the output of the summer. Similarly, in summer 400 the vertical component of the target line of sight position is compared with the vertical component of the missile line of sight position and this difference developed at the output of summer 400. These signals are supplied through a limiter generally indicated at 402 including a diode bridge with a pair of Zener diodes 404 and 406 in turn supplying a level set network generally indicated at 408 including operational amplifiers 410 and 412. The level of this circuit is set by the tap of potentiometer 414 connected between system ground and a positive DC power supply terminal 416.

From the level set network, the signals are passed through additional operational amplifiers 418 and 420 forming portions of two wave-shaping and damping networks generally indicated by the numerals 422 and 424. Finally, the vertical missile versus target error signal is supplied to one input of an adaptive controller 426 while the horizontal missile versus target error signal is supplied to the other input of this controller. The output from the adaptive controller 426 is supplied as a command signal to the transmitting antenna 52 of FIG. 1. The adaptive controller 426 is provided to adapt the output signals to the dynamics of the particular missile to be controlled.

As can be seen from the above, the present invention provides a highly accurate guidance system for command guided missiles. In its broadest aspect, the present invention provides for automatic tracking of both the target and missile and a comparison of their line of sight positions with respect to a common reference, which common reference is the boresight axis of the optical system 20. Any difference in these automatic tracking signals is supplied as an error command to a transmitting antenna which directs the missile to correct its course so as to bring its line of sight position into coincidence with the line of sight position of the target. A further feature of the present invention is the provision of a stabilized platform for the optical system permitting the optical system to automatically track the target. Error signals developed in the target tracking portion of the system are supplied to a pair of torque motors which torque the gimbal support for the optical system in such a manner as to cause the optical system to track the target and keep the reference axis or boresight axis of the optical system constantly centered on the target.

The present invention helps to satisfy the continuing need for improved effectiveness in the delivery of tactical missiles encompassing the area of guidance accuracy, launch vehicle and operator attrition, operator participation in guidance functions, and system operational limits. It enhances missile delivery effectiveness by the use of automatic tracking and guidance techniques. Additional features include improved guidance accuracy, increased launch vehicle to target separation range and reduced operator participation thus freeing him for aircraft flight and enabling him to at take more effective evasive action. A nighttime operational capability is also provided by this system.

Only preliminary manipulations by the pilot are essential to the operation of the system which preliminary operations occur during the prelaunch phase. These tasks are interpretations of the displayed target data on the TV monitor, identification of the desired target, positioning the target racker axis on the selected target and initiation of the automatic target tracking and the missile launch functions. The pilot's post-launch task is completely supervisory in nature in that he need exercise no missile control function unless he elects to reposition the target tracker axis to redefine the target lock on point in order to manually override and take control of the missile flight. The dichroic beam splitter or the red and blue filters provide a spectral separation of the incoming optical energy and allows selected wavelengths corresponding to the energy from the target to pass to the target tracker and reflects certain other energy wavelengths to the missile tracker. By proper selection of the camera tube input and missile flare spectral characteristics, the flare and target images can easily be separated for the purposes of independent tracking. A wide variety of target and missile optical characteristics can be selected through the use of appropriate filters in a well-known manner.

The target tracker not only automatically tracks the selected target but provides image information suitable for display to and interpretation by the pilot including identification of the active tracking area or window within the tracker field of view. It also generates output error signals in pitch and yaw corresponding to the current target position relative to an initial tracker boresight reference position which error signals are utilized to precess the optical system to cause it to stay in alignment with the target irrespective of movement of either the target or movement of the aircraft position and these are compared with the target information so that an error signal is derived and utilized to direct the missile and correct its flight path. The tracker also generates a missile flare image which accurately locates the missile line of sight relative to the target line of sight and presents it on the TV monitor.

This invention may be embodied in other specific forms without departing from the spirit or essential characteristics thereof. The present embodiment therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A missile guidance system comprising an optical system for receiving spectral energy from both a target and a missile, said optical system having an optical boresight axis, means in said optical system for separating target spectral energy from missile spectral energy, a target camera tube coupled to said optical system for developing an electrical signal representative of said target energy, a missile camera tube coupled to said optical system for developing an electrical signal representative of said missile energy, a TV monitor, means for feeding both said target energy signal and said missile energy signal to said TV monitor, a target tracking circuit for developing a difference signal representative of the difference in the line of sight position of said target from said boresight axis, means coupling said target energy signal to said target tracking circuit, a missile tracking circuit for developing a difference signal representative of the difference in the line of sight position of said missile from said boresight axis, means coupling said missile energy signal to said missile tracking circuit, means for comparing said difference signals to produce an error signal, and means for transmitting said error signal as a correction signal to said missile.

2. A system according to claim 1 including a stabilization platform supporting said optical system, a control stick, means for generating control signals in response to movement of said control stick, means for applying said control signals to said platform to initially align said boresight axis with said target, and means for applying said target difference signal to said platform to cause said boresight axis to follow said target.

3. A system according to claim 2 including means for obtaining target tracking window signals from said target tracking circuit and displaying said window signals on said TV monitor, and means for obtaining missile crosshair signals from said missile tracking circuit and displaying said crosshair signals on said TV monitor.

4. A missile guidance system comprising a stabilized platform, an optical system having a boresight axis mounted on said platform for receiving spectral energy from both a target and a missile, a beam splitter coupled to said optical system for separating said target energy from said missile energy, a target vidicon for receiving said target energy from said beam splitter and producing an electrical target signal, a missile vidicon for receiving said missile energy from said beam splitter and producing an electrical missile signal, a target tracking circuit coupled to said target vidicon for producing a target difference signal representative of the line of sight deviation of said target from said boresight axis, a missile tracking circuit coupled to the output of said missile vidicon for producing a missile difference signal representative of the line of sight deviation of said missile from said boresight axis, means for comparing said target difference signal with said missile difference signal to produce an error signal, means for transmitting said error signal to said missile, means for feeding said target difference signal to said platform to cause said boresight axis to follow said target, a TV monitor, means coupling the outputs of said vidicons to said TV monitor, means for displaying target tracking signals and the position of said missile on said TV monitor, manual control means for developing manual control signals and means for applying said manual control signals to said platform to initially position said boresight axis on said target.

5. A system according to claim 4 wherein each of said missile and target tracking circuits comprises vertical and horizontal early and late gates, means for deriving gated signals from said target tracking circuit representative of a target window centered about the line of sight position of said target, means for displaying said target gated signals on said TV monitor, means for deriving gated signals from said missile tracking circuit representative of a crosshair centered on the line of sight position of said missile, and means for displaying said missile gated signals on said TV monitor.

6. A system according to claim 5 wherein said manual control means comprises a control stick, a pair of potentiometers forming a variable wheatstone bridge, and linkage means coupling said control stick to the movable taps on said potentiometers.

7. A system according to claim 6 wherein said platform is provided with a pair of torque motors for moving said platform about mutually perpendicular elevation and deflection axes, and means coupling the movable tap on one of said potentiometers to one of said torque motors, and means coupling the movable tap on the other of said potentiometers to the other of said torque motors.

8. A missile guidance system comprising a stabilized platform, an optical zoom lens system having a boresight axis mounted on said platform for receiving spectral energy from both a target and a missile, a beam splitter coupled to said optical system for separating said target energy from said missile energy, a target vidicon for receiving said target energy from said beam splitter and producing an electrical target signal, a missile vidicon for receiving said missile energy from said beam splitter and producing an electrical missile signal, a TV monitor, means coupling the outputs of said vidicons to said TV monitor, a target tracker coupled to the output of said target vidicon, a missile tracker coupled to the output of said missile vidicon, each of said trackers having horizontal and vertical tracking channels, a pair of early and late gates in each of said channels, algebraic summing means coupled to the outputs of a missile tracker coupled to output of said missile vidicon, each gates in each channel, an integrator coupled to the output of each summing means, means for deriving a difference signal from each of said integrators, means for comparing the difference signals from the two horizontal channels to produce a horizontal error signal, means for comparing the difference signals from the two vertical channels to produce a vertical error signal, an adaptive controller for combining said error signals, antenna means coupled to said adaptive controller for transmitting said combined error signals as a command to said missile for correcting its flight, means coupling said target tracker to said TV monitor to produce a target tracking image on said monitor, and means coupling said missile tracker to said TV monitor to produce a missile tracking image on said monitor.

9. A system according to claim 8 wherein said target tracking image is a rectangular window centered on the line of sight position of said target, and said missile tracking image is a crosshair centered on the line of sight position of said missile.

10. A system according to claim 8 including manual switch means for causing said zoom lens system to alternatively assume zoom in and zoom out conditions to vary the optical magnification of said lens system.

11. A system according to claim 8 wherein said optical lens system, said beam splitter and said vidicons are all mounted on a pair of gyro stabilized gimbals.

12. A system according to claim 11 including torque motors coupled to the deflection and elevation axes of said optical lens system, a control stick positioned adjacent said TV monitor, a wheatstone bridge having an output variable in accordance with the position of said control stick, and means coupling the output terminals of said wheatstone bridge to said torque motors.

13. A system according to claim 12 including means for feeding said difference signals from said target horizontal and vertical channels to said torque motors to cause said optical lens system to follow said target.

14. A missile guidance system comprising a single optical system for dealing with a target and a missile, said optical system having an optical boresight axis, means for initially positioning said axis on a target, means in said optical system for differentiating between energy received from the target and energy received from a missile flying toward the target, means coupled to said optical system and responsive to said energy for developing first and second electrical signals, said first signal representing the current deviation of the line of sight position of the target from said axis, said second signal representing the deviation of the line of sight position of the missile from said axis, means for comparing said signals to produce a difference signal, means for transmitting said difference signal as a command to the missile to correct its flight, and means for selectively changing the field of view of said optical system to enhance accuracy.